(12) United States Patent
Boeker

(10) Patent No.: US 11,659,059 B2
(45) Date of Patent: May 23, 2023

(54) PARALLEL SHARING OF HARDWARE

(71) Applicant: Hewlett Packard Enterprise Development LP, Houston, TX (US)

(72) Inventor: Craig A. Boeker, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 265 days.

(21) Appl. No.: 16/290,206

(22) Filed: Mar. 1, 2019

(65) Prior Publication Data
US 2020/0280612 A1 Sep. 3, 2020

(51) Int. Cl.
*G06F 15/173* (2006.01)
*H04L 67/562* (2022.01)
*G06F 9/54* (2006.01)

(52) U.S. Cl.
CPC ............ *H04L 67/562* (2022.05); *G06F 9/542* (2013.01); *G06F 9/547* (2013.01)

(58) Field of Classification Search
CPC .... H04L 63/10; H04L 63/0272; G06F 9/5072
USPC .......................................................... 709/223
See application file for complete search history.

(56) References Cited

U.S. PATENT DOCUMENTS

| | | | |
|---|---|---|---|
| 8,069,257 B1 * | 11/2011 | Bhatia .................... | G06F 13/105 370/386 |
| 8,613,070 B1 * | 12/2013 | Borzycki ................ | H04L 67/10 726/8 |
| 8,954,312 B2 | 2/2015 | Lloret et al. | |
| 9,384,018 B2 * | 7/2016 | Du .......................... | H04L 43/50 |
| 10,148,493 B1 * | 12/2018 | Ennis, Jr. ................ | G06F 9/541 |
| 10,572,315 B1 * | 2/2020 | Lusk ........................ | G06F 9/54 |
| 10,776,286 B1 * | 9/2020 | Kulchytskyy ............. | G06F 8/65 |
| 2002/0194392 A1 * | 12/2002 | Cheng ................. | G06F 11/3006 719/318 |
| 2004/0083356 A1 * | 4/2004 | Chatterjee ............... | G06F 9/526 713/1 |
| 2004/0093198 A1 | 5/2004 | Neifert et al. | |
| 2006/0020940 A1 | 1/2006 | Culter | |
| 2007/0244987 A1 * | 10/2007 | Pedersen ................. | H04L 67/06 709/217 |
| 2007/0299819 A1 * | 12/2007 | Markel .................... | H04L 69/18 |
| 2007/0299848 A1 * | 12/2007 | Markel .................... | H04L 41/00 |

(Continued)

OTHER PUBLICATIONS

Unemyr, M.; "Device Driver Development: the Ultimate Guide for Embedded System Developers"; Oct. 21, 2006; 20 pages.

*Primary Examiner* — Umar Cheema
*Assistant Examiner* — Tesfu N Mekonen
(74) *Attorney, Agent, or Firm* — Mauriel Kapouytian Woods LLP

(57) ABSTRACT

Systems and methods are provided for filtering management application instances intended to manage hardware in a system, such as configuring a computing component. Filtering of the management application instances can be performed by a filtering proxy application configured to operatively sit between each management application instance and a management interface of the hardware. Filtering the management application instances may include substituting values or attributes in/transforming requests, responses, state information, event information, so that it appears to the computing component and each of the management application instances as if each of the management application instances has exclusive control of the computing component.

21 Claims, 5 Drawing Sheets

(56) References Cited

U.S. PATENT DOCUMENTS

| | | | |
|---|---|---|---|
| 2008/0071651 A1* | 3/2008 | Markel | G06Q 40/06 |
| | | | 705/30 |
| 2013/0185435 A1* | 7/2013 | Dinger | G06F 9/5061 |
| | | | 709/226 |
| 2014/0207918 A1* | 7/2014 | Kowalski | G06F 11/0709 |
| | | | 709/220 |
| 2018/0046486 A1* | 2/2018 | Maity | G06F 9/45508 |
| 2018/0089005 A1* | 3/2018 | Green | G06F 9/547 |
| 2018/0167268 A1* | 6/2018 | Liguori | G06F 15/167 |
| 2019/0095254 A1* | 3/2019 | Rao | G06F 9/45558 |
| 2019/0260829 A1* | 8/2019 | Cencini | G06F 1/206 |

* cited by examiner

PARALLEL SHARING OF HARDWARE

DESCRIPTION OF RELATED ART

Enterprise computing components, such as servers, enclosures, blades, etc. may include or provide management interfaces that are controlled through an API, and designed to be owned and managed by a single user/manager. In environments with many users (e.g., software developers in a development environment), separate computing components are generally obtained and maintained for each user to manage. Alternatively, access to a single computing component that multiple users want to manage can be controlled through time-sharing, e.g., where a user is allowed access to the computing component one-at-a-time. Alternatively still, computing components may be simulated in software so that multiple users may access and control simulated versions of the computing components without the need to share.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
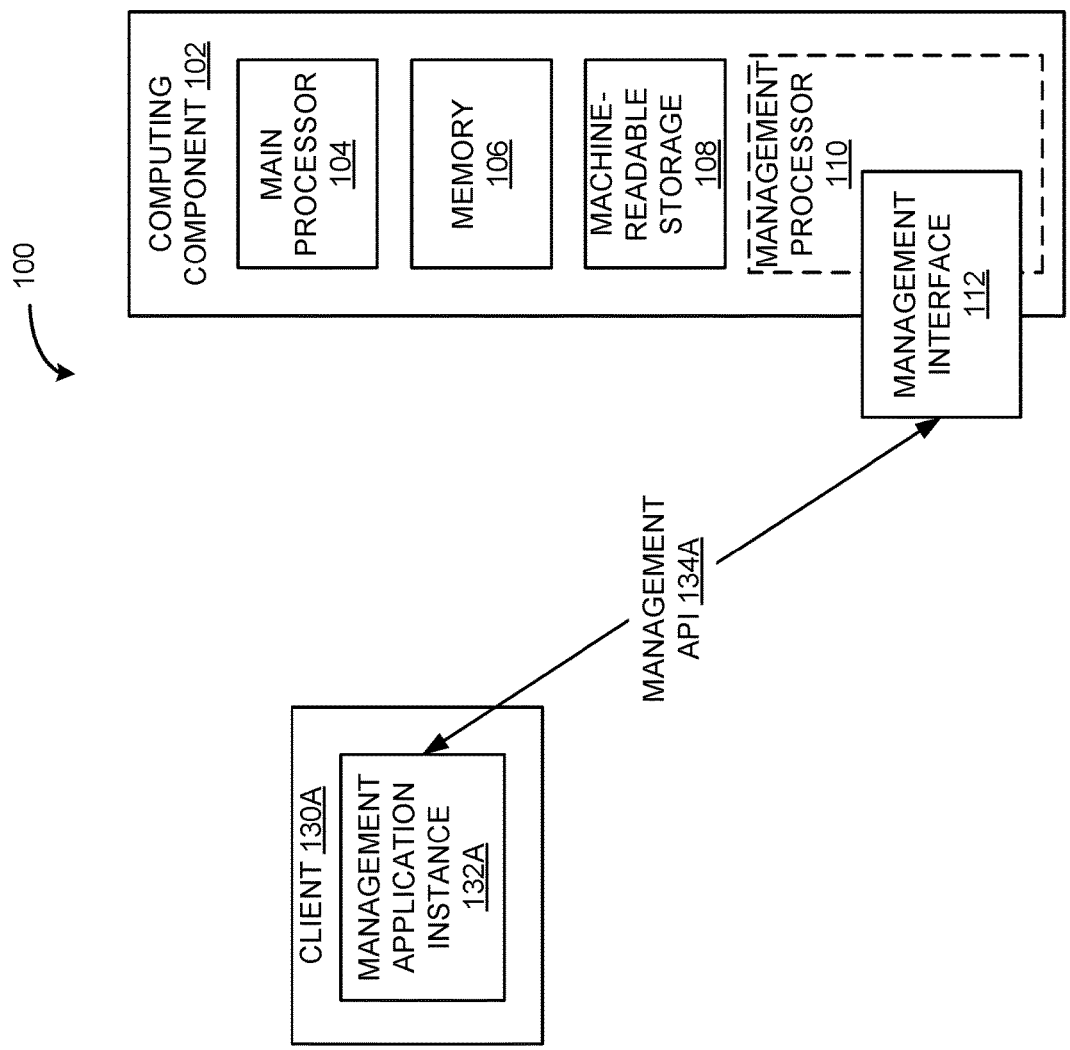
FIG. 1 illustrates an example computing system.

The figures are not exhaustive and do not limit the present disclosure to the precise form disclosed.

DETAILED DESCRIPTION

As alluded to above, computing components, such as servers, enclosures, blades, etc. provide management interfaces that can be controlled through an API, and are generally designed to be owned and managed by a single user/manager. However, in multi-user environments, conventional methods that rely on obtaining and maintaining separate computing components for each user to manage can be cost-prohibitive, as the number of users and computing components increases. For example, there must be sufficient datacenter space to house the computing components, there must be sufficient power to run and cool the computing components, etc.

Timeshared access to a single computing component that multiple users want to manage can also lead to time inefficiencies. For example, in a development environment, where multiple developers desire access to a hardware component, conventional systems and methods allow a single developer access to the hardware component. Other developers wait until the single developer (currently with access to the hardware component), relinquishes control of the hardware component.

Moreover, simulated computing components that users can manage may be inaccurately represented. For example, large multi-core processing systems are often simulated to judge their performance prior to actual implementation. However, these large, multi-core processing systems often have complex memory structures or hierarchies (e.g., having multiple cache levels) that are difficult or costly to emulate in a simulation. Additionally, hardware or computing components under development can be subject to constant change, making it difficult to stay up-to-date with simulated versions of those computing components or that hardware.

Accordingly, a filtering proxy application may be implemented between each instance of a management application being owned and managed by a user or manager and a management interface of a computing component. The filtering proxy application acts as an intermediary that intercepts API calls and management application requests/responses. The filtering proxy application may mimic the computing component API(s) operative between each management application instance and the computing component, while substituting values and attributes in requests/responses so that to each management application instance, it appears as they exclusively own and manage the computing component.

When API calls involve single user/configuration actions, the filtering proxy application can perform many-to-one-to-many translations of information as needed. For example, the filtering proxy application may separately control password authentication for each management application instance to access the computing component. As another example, the filtering proxy application can manage different, requested configurations of the computing component relative to each management application instance by, e.g., defining only a single allowed configuration, while caching unconfigured state information until a configuration call is received, at which time, live configured data (filtered for a user) could be returned.

FIG. 1 illustrates an example system 100, in accordance with some embodiments of the present disclosure. As illustrated, in some embodiments, system 100 may include a computing component 102 and a client 130A, which can be a remote client. It should be understood that system 100 may include a plurality of additional computing components, clients, or other elements, not necessarily illustrated for ease of description. System 100 may be an example of a computing environment such as a development environment, server farm, data center, etc. Computing component 102 may be, for example, a computer, a portable device, a server, a network client, a communication device, a data store, etc. Computing component 102 may also be any grouping of related or interconnected devices, such as a blade server, a computing cluster, and the like. Thus, embodiments disclosed herein can be applied to groups of computing components that may need to perceived as being under the exclusive control or management of a single entity, such as a manager, administrative group, etc.

In some embodiments, computing component 102 can include a main processor 104, a memory 106, machine-readable storage 108, and a management processor 110. It should be understood that only basic aspects/elements of computing component 102 are illustrated for ease of description, and that computing component 102 may comprise more or less elements, such as, e.g., user interfaces, display elements, and the like. As further illustrated in FIG. 1, main processor 104 may be a hardware device that executes program instructions stored in machine-readable storage 108. For example, main processor 104 may be a microprocessor, a microcontroller, multiple processors, a microprocessor including multiple processing cores, and so forth.

Memory 106 can be any type of computer memory (e.g., dynamic random access memory (DRAM), static random-access memory (SRAM), etc.).

In some embodiments, management processor 110 may be a hardware device that is separate from main processor 104, and that may be dedicated to the management of computing component 102. For example, management processor 110 may be a Baseboard Management Controller (BMC). In some embodiments, management processor 110 may conform to the Intelligent Platform Management Interface (IPMI) standard.

As used herein, a management processor can include a hardware processor that is dedicated for management of a computing component or device, such as computing component 102. A management processor may execute or be executed in a separate or isolated manner from the main processor (e.g., main processor 104) of a computing system (e.g., computing component 102). As noted above, an example of a management processor can include a BMC, which can refer to a specialized microcontroller embedded on a motherboard of a computing component such as a server. As also noted above, a BMC can support an IPMI architecture, which defines a set of common interfaces to computer hardware and firmware. The common interfaces can be used by users, such as system administrators, developers, and the like to monitor health and manage a computing component. Accordingly, management processor 110 can be used to manage the interface, in this example, management interface 112, between system management software and hardware of computing component 102, and may provide remote management access to computing component 102. It should be noted that in some embodiments, management interface 112 may be provided by software running on main processor 104. Accordingly, in such embodiments, there may not be a separate management processor 110 needed.

Management processor 110 may provide such remote management access over an out-of-band communication channel, which isolates management communication from communication of an operating system (OS) running on the computing component 102. In some instances, management processor 110 may enable lights-out management of the computing device, which provides remote management access (e.g., system console access) to computing component 102 regardless of whether computing component 102 is powered on, whether a primary network subsystem hardware is functioning, or whether an OS is operating or even installed.

In some embodiments, management processor 110 may execute management code to provide one or more management application programming interfaces (APIs), e.g., management API 134A used by a client device, such as client 130A to manage computing component 102 (or some aspect(s) thereof). In some embodiments, client 130A may use management API 134A to manage computing component 102, for example, by controlling management interface 112. As used herein, an API may be some set of functions or procedures that allow for the creation or use of applications that access the features or data of an OS, application or other service, in this example, management interface 112 of management processor 110. Management API 134A may be a representational state transfer (REST) API, a simple object access protocol (SOAP) API, or other appropriate API that can be used to control management interface 112 and ultimately manage computing component 102.

In some embodiments, client 130A may be a computing device remotely communicating with the computing component 102. Further, client 130A may include various hardware and/or software components (not shown). For example, client 130A may include a hardware processor executing client software or firmware. However, other embodiments are possible. For example, in some embodiments, client 130A may be software or firmware executed by main processor 104, e.g., software running on a virtual machine in a hypervisor/virtual machine monitor.

As noted above, a user or manager may wish to have access to and control computing component 102, and this access/control may be effectuated through management processor 110 running or providing management interface 112 that can be controlled by management API 134A. Management applications can refer to remote (or local) programs) for performing one or more management actions on or related to elements of a system or computing component, such as computing component 102. Management actions may include, but are not limited to changing, interrogating, controlling, tracking, or listing elements of computing component 102. Management actions can also include, but again, are not limited to, running a diagnostic test, upgrading software or firmware, controlling a power state, controlling device settings, reading device data, and so forth.

As illustrated in FIG. 1, an instance of a management application 132A running on client 130A may be supported by and in operative communication with management interface 112. In some examples, the data communications between management processor 110 and client 130A may use a dedicated management channel (referred to as "out-of-band communication"). In some embodiments, management processor 110 may interface with one or more sensors (not shown) to monitor environmental conditions of computing component 102.

In conventional systems, a management application instance is exclusive in the sense that only a single management application instance is usually allowed to access and control (or otherwise interact) with management interface 112 of computing component 102. This can lead to the aforementioned issues and inefficiencies associated with conventional systems. That is, working with management software, e.g., a management application, that uses one or more management APIs to manage a computing component involves a user having exclusive access to the computing component in order to have their instance of the management application under development be the single manager of the computing component. Therefore, environments with large numbers of users requires a large number of computing components being managed in order to allow the users to be productive.

An example of a management application instance is the OneView® software provided by Hewlett Packard Enterprise, which is configured to run on a main processor, e.g., main processor 104) of a computing component in a traditional operating system such as CentOS. It should be noted that a management application instance, such as management application instance 132A may run on a virtual machine instance configured/delivered as a virtual appliance, or alternatively, it may run on a physical application, such as that installed in a server blade within a Hewlett Packard Enterprise Synergy enclosure. Accordingly, in some embodiments, use of a filter proxy (described in greater detail below) can be extended to sharing management application instance 132A using its API (for example, in a scenario where the target of development is a management application).

The aforementioned filtering proxy application allows for computing component-sharing that avoids the downsides associated with, e.g., timesharing. In particular, and as alluded to above, the filtering proxy application allows for a single instance of uniquely owned hardware among multiple management application instances that each interact with it as if they were the exclusive manager of the computing component. This equates to parallel sharing of hardware instead of serial or sequential sharing (timesharing).

Figure 2:
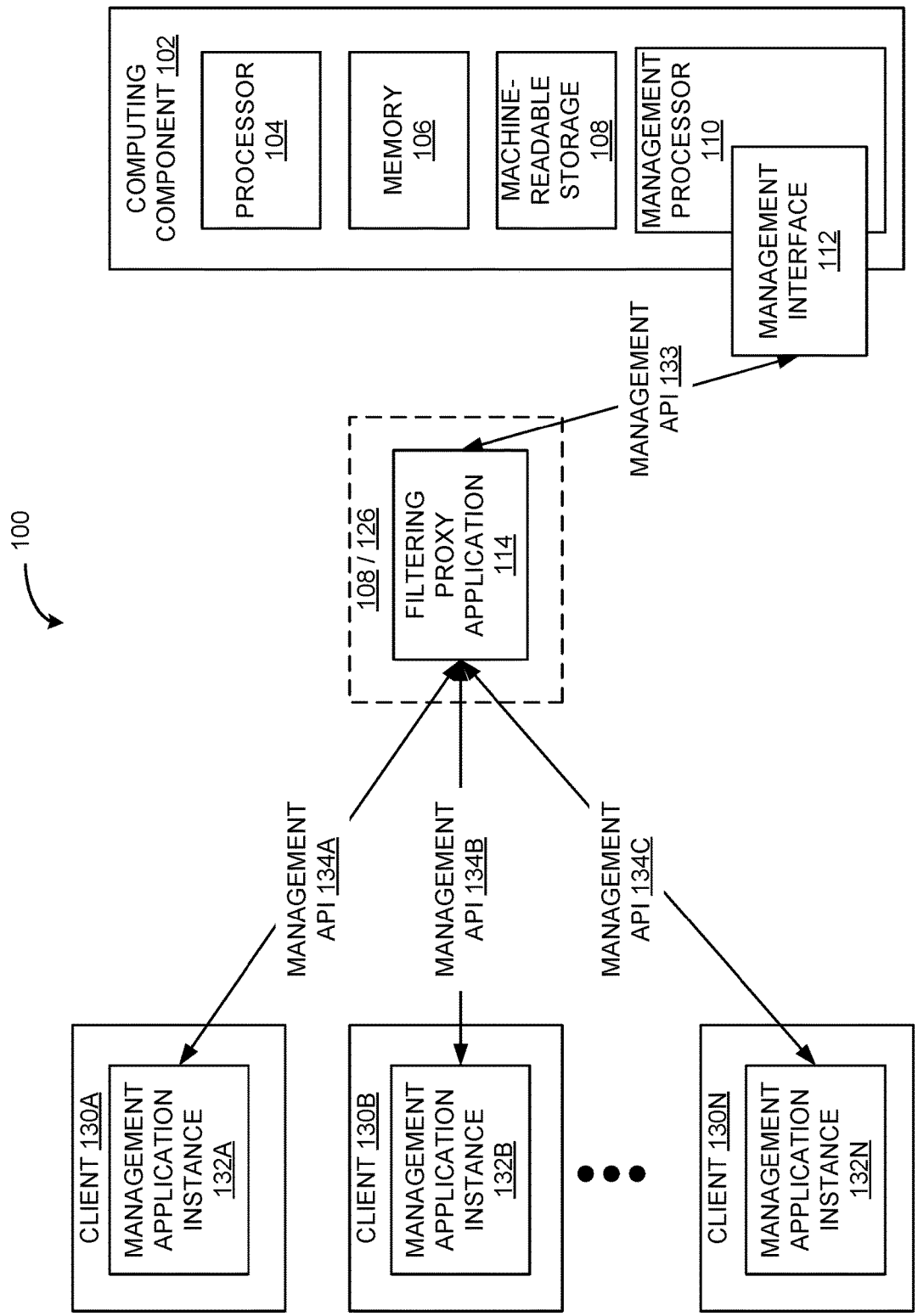
FIG. 2 illustrates the use of a filtering proxy application in the example computing system of FIG. 1 to allow for parallel hardware sharing in accordance with various embodiments.

FIG. 2 illustrates example system 100 in which a filtering proxy application in accordance with various embodiments of the present disclosure may be implemented to achieve parallel sharing of hardware, in this example, computing component 102. Computing component 102 (as already discussed above and illustrated in FIG. 1) may include, but is not limited to processor 104, memory 106, machine-readable storage 108, and management processor 110 which may provide management interface 112.

Unlike the example illustrated in FIG. 1, however, a filtering proxy application 114 may be implemented between one or more management application instances running on a client. In this way, management API calls from a plurality of management application instances directed to a management interface can be intercepted, transformed or translated (if needed), and handled as if each management application instance was exclusively managing the hardware. The same holds true for responses to those management API calls from management interface 112. Filtering proxy application 114 may be implemented on a device remote from computing component 102, such as a centralized server, dedicated server, etc., within system 100, such as a server 126. Alternatively, filtering proxy application 114 may be stored on machine-readable storage 108 and executed by processor 104 or management processor 110 of computing component 102. Filtering proxy application 114 is illustrated in FIG. 2 as being separate from computing component 102 merely to highlight its operation, conceptually (not necessarily literally) as being between a management application instance and the hardware the management application instance is managing.

FIG. 2 illustrates clients 130A, 130B . . . 130N, each running corresponding management application instances 132A, 132B . . . 132N. Each of clients 130A, 130B . . . 130N may manage computing component 102 through management interface 112 vis-à-vis corresponding management APIs 134A, 134B . . . 134N. Not only does filtering proxy application 114 operate so as to make it appear that each of management application instances 132A, 132B . . . 132N are exclusively managing computing component 102, but filtering proxy application 114 operates so that computing component 102 is not aware that multiple application instances 132A, 132B . . . 132N are managing it. Accordingly, like the example of FIG. 1, management interface 112 only provides a single management API 133 or single set of management APIs 133 as if it were being managed by a single management application instance. It should be noted that various embodiments of the present disclosure still provide utility in single management application instance scenarios. That is, filtering proxy application 114 may still be used even if a single management application instance 132A is managing computing component 102. As will be described below, substitutions, translations, and the providing of management APIs can still be performed in the same way with a single management application instance. In some embodiments, filtering proxy application 114 or management interface 112 may sense or determine (through the use of sensors, through historical review of received API calls, etc.) that only a single management application instance is operating. Accordingly, filtering proxy application 114 may simply act as or be instructed to operate as a relay or passthrough mechanism that forwards management API calls/responses to and from the single management application instance, e.g., 132A and management interface 112.

Management APIs may be "generic" or "specific." Generic management APIs can refer to APIs or aspects of APIs that do not need to be processed or handled in a manner specific to each management application instance. In contrast, specific management APIs can refer to APIs or aspects of APIs that are specific to single or exclusive ownership/management of computing component 102. As will be described in greater detail below, specific management APIs may involve many-to-one-to-many translations.

When filtering proxy application 114 receives generic read API calls to perform some generic management action, the same management API, e.g., management API 133 used by management interface 112, can be used by mimicking computing component 102, in particular management processor 110/management interface 112. This can be accomplished by filtering proxy application 114 listening on a unique and different IP address or port of management interface 112, or alternatively, by acting as a proxy in the communication channel to computing component 102. It should be noted that this approach generally applies regardless of the communication mechanism or protocol being used (whether SOAP, REST, hypertext transfer protocol (HTTP), HTTP secure (HTTPS), generic sockets, etc.).

For example, REST APIs can be accessed via HTTP/HTTPS requests which are relatively easy to describe and understand. From an implementation standpoint, standard HTTP/HTTPS web servers and proxies are readily available, such as Apache, a common open source web server that provides proxy capability. Accordingly, in some embodiments, Apache can be used as a basis for implementing filtering proxy application 114, where Apache extensions can be written to support the capabilities needed to effectuate filtering proxy application 114. That is, in one embodiment, an Apache web server can be configured to listen in on a specific IP address (that of a management processor or computing component), and proxy all requests to the management interface. This could be used to support the aforementioned generic management APIs without any/little development effort. Specific management APIs could be supported with development of, e.g., the aforementioned extensions or customized configurations of the Apache web server.

Further regarding generic API calls, filtering proxy application 114 may substitute values and attributes in an outbound request (e.g., management API 134B from management application instance 132B) to transform the outbound request from one originating from management application instance 132B and directed to filtering proxy application 114, to one originating from filtering proxy application 114 and directed to management interface 112. That is, management application instance 132A may generate a generic management API call vis-à-vis management API 134A. From the perspective of management application instance 132A, filtering proxy application 114 is for all intents and purposes, management interface 112, even though it is not. Thus, to make it appear that management application instance 132A is exclusively managing computing component 102 through management interface 112, filtering proxy application 114 performs the necessary substitutions so that the outbound request goes to management interface 112. For example, if the outbound request involves or includes an IP address or name that identifies management application instance 132A (the requestor) in the outbound request, filtering proxy application 114 substitutes its own IP address or name for that of management application instance 132A. The outbound request may then be communicated to management interface 112. Moreover, from the management interface 112's perspective, filtering proxy application 114 appears to be management application instance 132A.

In the context of a response, by way of management API 133 from management interface 112, filtering proxy application 114 may substitute any values or attributes needed to transform the response. The transformation is meant to make the response one that is from management interface 112 to filtering proxy application 114 to a response one that is from management interface 112 to management application instance 132A by way of management API 134A. For example, filtering proxy application 114 may receive a response by way of management API 133 from management interface 112, the response including one or more details (i.e., information, data, metadata, etc.) indicating that filtering proxy application 114 is the exclusive manager or owner of computing component 102. These details may include one or more of the following, but are not limited to, the name, location, IP address, etc. of filtering proxy application 114. Filtering proxy application 114 may substitute its own details for that of client 130A/management application instance 132A. The response by way of management API 134A can then be sent to management application instance 132A, where management application instance 132A may only be one of a plurality of concurrently operation management application instances, e.g., 132B . . . 132N. It should be noted in some embodiments, filtering proxy application 114 may "short-circuit" transforming and relaying the outbound request, and simply respond to management application instance 132A with, e.g., cached data.

In the case of specific management APIs, where a management API call or response relates to a particular aspect(s) of a management API specific to single ownership or configuration of computing component 102, filtering proxy application 114 may perform many-to-one-to-many translations as needed. That is, filtering proxy application 114 may have to handle multiple outbound requests from, e.g., a plurality of management application instances. Those outbound requests or information in/associated with those outbound requests, may include, but are not limited to, e.g., device identifiers, locations, or configuration parameters for computing component 102. Filtering proxy application 114 may need to make substitutions or implement actions regarding those multiple outbound requests ("many") at computing component 102 ("one"), and respond to each requestor ("many").

For example, an outbound request may involve configuring a management password on computing component 102, that management password being unique to a particular management application instance, e.g., management application instance 132B. In this case, filtering proxy application may establish or set an "actual" management password used to access computing component 102 through management interface 112. This actual management password will be used to access computing component 102 through management interface 112 regardless of what any of management application instances 130A, 130B . . . 130N indicate or set as a (unique) management password from their respective perspectives. This actual management password may be stored locally by filtering proxy application 114, e.g., in a local cache or in memory/storage of the computing component or operating instance on which filtering proxy application 114 is operating. For example, the actual management password may be stored in memory 106/machine-readable storage 108 of computing component 102 or some memory of server 126 (not shown). Thus, each time an outbound request comes from any of the management application instances 130A, 130B . . . 130N, filtering proxy application 114 may determine whether or not the received management password matches that which the management application instance specified. For example, filtering proxy application 114 may store a specified management password in a cache or other memory (as described above with respect to an actual management password), and upon receiving the management password during an authentication session, can compare the received management password with the stored management password. If they match, filtering proxy application 114 can substitute or replace the management password received from the management application instance with that of the actual management password in a new/revised outbound request directed to management interface 112. This can be performed for each management application instance. In this way, the management application instance will think it has been authenticated to management interface 112.

It should be understood that filtering proxy application 114 can handle the aforementioned management password scenario in another way. Instead of storing and comparing received management passwords from each management application instance, filtering proxy application may simply ignore received management passwords, and allow each management application instance to be authenticated using the actual management password. It should be noted that the particular API(s) that can be used to handle such a scenario can vary as it may depend on the specific operating/configuration characteristics of computing component 102 or the API(s) themselves. One of ordinary skill in the art would understand how to implement this many-to-one-many translation accordingly.

As another example, filtering proxy application 114 may have to address outbound requests to configure computing component 102 from one or more of management application instances 130A, 130B . . . 130N. For example, management application instances 130A and 130B may both wish to configure memory 106 to have a particular memory hierarchy involving cache levels, both dedicated and shared. The actual configuration of memory 106 on computing component 102 can only have one actual configuration. When management application instances 132A, 132B read back the memory configuration each has a different expected configuration—the one each requested. If the configuration read differed from the one written, that would be recognized as an out-of-band change having occurred to the configuration. To prevent this from happening, filtering proxy application 114 will ensure that each management application instance 132A, 132B receives the memory configuration it requested when it reads the memory configuration.

Still another example may involve the relationship a management application such as the aforementioned OneNote may have with a remote server management tool (an example of which is Integrated Lights Out (iLO) also provided by Hewlett Packard Enterprise Company. That is, a OneView instance may exclusively manage an iLO deployment, and configures the iLO deployment with a URL to a OneView web interface. Thus, each OneView instance sharing the iLO deployment would try to configure that iLO deployment with its own unique URL. Without filtering proxy application 114 filtering responses, each OneView instance, when reading what as was configured in the iLO deployment would receive the same value, where at best, only a single OneView instance would see that the URL was directed to itself. At worse, no OneView instance would see the correct URL if, e.g., filtering proxy application 114 merely wrote a link to itself (without performing the requisite substitutions/transformations). Indeed, various embodiments of the present disclosure can be applied to scenarios involving most any writeable value in a managed computing component along with its configuration value, as well as other read-only values affected by the writeable values.

In the aforementioned example, each user/manager may try to configure computing component 102 with a different configuration, including possibly resetting computing component 102 or some element(s) thereof at some point. To accomplish this without causing computing component 102 to look incorrectly configured to all but one manager despite having potentially conflicting configurations, filtering proxy application 114 may define a single allowable configuration and cache the unconfigured state. Data representing the cached unconfigured state would be returned until the configuration call(s) were received, at which time live configured data (filtered for the particular requesting manager) could be returned. Filtering proxy application 114 can track the configured/unconfigured states of computing component 102 for that manager, and return the appropriate data. Moreover, filtering proxy application 114 may intercept reset requests and reset the tracked state to an unconfigured state without passing them through to reset computing component 102. Configuration calls that do not match the supported configuration would return failures.

In some embodiments, computing component 102 may also provide information, including events, related to other computing components or hardware. In such an embodiment, any IP addresses representing those other computing components or hardware may need to be filtered by filtering proxy application 114 based on the implantation method (inserted as a real proxy or listening on different IP addresses). Using OneView as an example again, an enclosure manager may extract information about components installed in an enclosure (blades, the switches, etc.). OneView may determine what blades/servers are located in a particular enclosure by querying the enclosure manager, which for example, may return a list of the blades including the IP addresses of the iLO applications in each blade, so that a OneView instance can access each iLO individually. Filtering proxy application 114 would replace those "direct" IP addresses to the blade iLOs with IP addresses that would allow filtering proxy application 114 to insert itself for that other hardware as well. Additionally, OneView may determine hardware characteristics about all the hardware in a system from the enclosure manager, including, as noted above, the IP addresses needed to access them. Moreover, OneView may leverage the enclosure manager for initial secure access/credentials.

The above scenario presents example of the types of information filtering proxy application 114 may need to provide parallel shared management of hardware. Indeed, most any data from a computing component may reference another computing component, and may need to be transformed by filtering proxy application 114. Hence, implementation of filtering proxy application 114 can be done with the knowledge of which APIs/requests need that type of filtering.

Further still, filtering proxy application 114 may provide support for asynchronous eventing (simple network management protocol (SNMP) eventing, real-time information server (RIS) eventing, etc.). In such cases, filtering proxy application 114 may configure itself as the event destination for computing component 102. Filtering proxy application 114 may then apply filters to events, possibly swallowing some, and forwarding copies of those events on to the managers via their respective management application instances.

It should be noted that the above-noted examples are not meant to be limiting in any way, and filtering proxy application can be configured to accommodate any appropriate filter/filtering desired for user in a system. As used herein, a filter or filtering can refer to any one or more actions taken by filtering proxy application 114 to maintain the operational appearance of exclusive or singular management of hardware, such as computing component 102 or one or more elements thereof.

Figure 3:
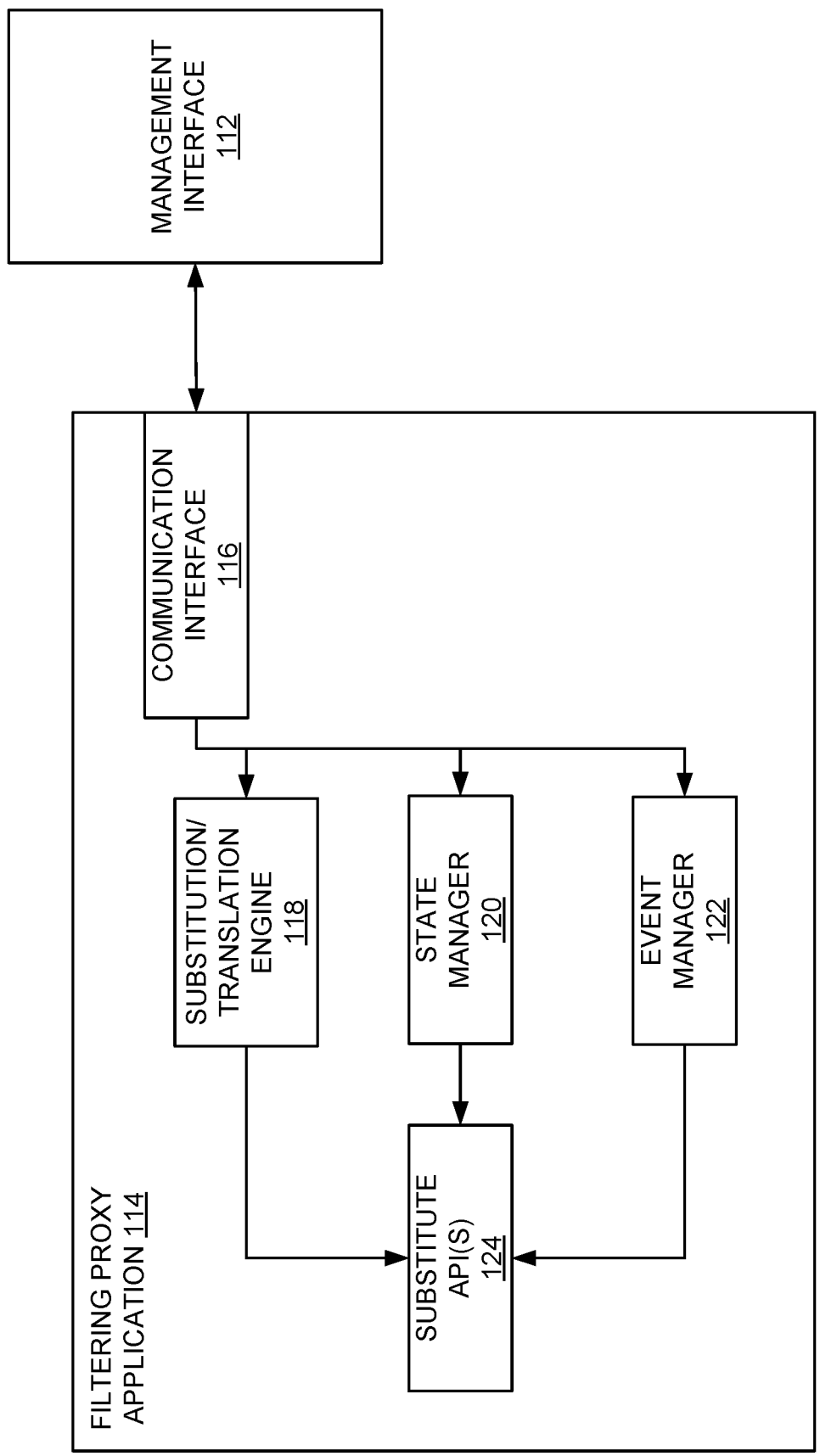
FIG. 3 illustrates an example schematic representation of the filtering proxy of FIG. 2.

Particular aspects of filtering proxy application 114 will now be described in conjunction with FIG. 3. As noted above, filtering proxy application 114 may communicate with management interface 112. For example, filtering proxy application 114 may relay transformed outbound requests from one of management application instances 132A, 132B . . . 132N to management interface 112, and vice versa. In this way, and as described above, any management application instance perceives itself as being the exclusive manager of computing component 102, and to management interface 112, it appears as though it has an exclusive manager (any one or more of the management application instances). Thus, filtering proxy application 114 presents a filtered version of a management application instance to system 100. Accordingly, as illustrated in FIG. 3, filtering proxy application may include a communication interface 116. Communication interface 116 may communicate using any known communication mechanism(s) appropriate for communicating with management interface 112 of computing component 102. As described above, management interface 112 may have its own communication interface, and communication interface 116 may be the same or have a similar corresponding interface as that of management interface 112.

Still referring to FIG. 3, filtering proxy application 114 may include a substitution/translation engine 118, a state manager 120, and an event manager 112. Filtering proxy application 114 may further include one of more substitute APIs 124.

Substitution/translation engine 118 may be logic that when executed substitutes one or more pieces of information in an outbound request such as an API call or response to an outbound request to make it appear as though a single management application instance is managing computing component 102. This substitution of information may involve replacing location, identifying, or other relevant information in an outbound request or response to/from that of a particular management application instance and management interface 112.

Substitution/translation engine 118 may also comprise logic that when executed can translate such outbound requests or responses from a many-to-one type outbound request/response and, when needed, back to a many type outbound request/response. This may entail replacing one or more pieces of information in an outbound request or response, or determining whether to relay or ignore an outbound request or response, depending on the circumstance of the management action at issue.

State manager 120 may comprise logic that when executed can be used to determine a current or correct/actual state of computing component 102 as well as the perceived state (to a management application instance) of computing component 102. In this way, changes such as configuration changes to computing component 102 can be properly reflected to any one or more of management application instances 132A, 132B . . . 132N without incorrectly configuring computing component 102 for one or more of the other management application instances.

Event manager 122 may comprise logic that when executed can be used to support eventing in computing component 102. That is, event manager 122 may be used to monitor computing component 102 events and respond to events (when appropriate) by configuring filtering proxy application 114 as an event destination. When a management application instance, e.g., management application instance 132B, wishes to exclusively manage computing component 102, management application instance 132B undergoes configuration actions in order to act as computing component 102's exclusive manager. Accordingly, when computing component 102 generates events, management application instance 132B configures itself as an event destination, e.g., when computing component 102 generates SNMP traps, management application instance 132B configures itself as a trap destination. In other words, event manager 122 can filter events regarding computing component 102. Moreover, event manager 122 may comprise logic that when executed may swallow some events, e.g., receive or acknowledge and event without passing information regarding the event to a management application instance. Alternatively, event manager 122 may forward information regarding an event, such as a copy of the event to a management application instance. In scenarios where event information is to be passed on to multiple management application instances, substitution/translation engine 118 may operate in conjunction with event manager 122 to effectuate proper routing.

It should be noted that in some scenarios, computing component 102 might use some type of broadcast approach for generating events. In such a scenario, filtering proxy application 114 may configure itself to watch for those broadcast traps from computing component 102 as a source. Filtering proxy application 114 may then regenerate/forward the broadcast traps with the filtered/proxied computing component 102 (effectively, filtering proxy application 114) as the source so management interface 112 is able to detect/receive the broadcast traps.

Substitute API(s) 124 can refer to the same APIs as those provided by management interface 112, differing only in the sense that substitute API(s) 124 are supported by back end or different target than those provided by management interface 112. For example, a REST API request may take the following form "HTTPS GET 1.2.3.4/Redfish/v1/Chassis," indicative of an HTTPS GET request to a specific URL that starts with an IP address indicating where to send the request. Filtering proxy application 114 can listen in on and IP address, e.g., IP address 172.18.5.6 for requests to that address by replacing "1.2.3.4" with 172.18.5.6. In other words, filtering proxy application 114 may receive a request and performs an internal lookup to determine where to redirect the request, and performs the request in accordance with the redirection. This can be performed generally, where any request to a particular IP address is redirected, even without being specifically called to do so.

It should be understood that other types of APIs work similarly. Generally, an API is defined somewhere, and the API gets directed to a target defined in some way. Filtering proxy application 114 provides a substitute API 123 that is identical to that from management interface 112 API, except that it applies to a different target. Any management application instance, e.g., management application instances 132A, 132B . . . 132N only has targets associated with filtering proxy application 114. In this way, filtering proxy application 114 can receive a request from a management application instance, and its implementation of the API (substitute API 124) can perform any necessary filtering, and send that filtered/proxied request to computing component 102 using its address. Likewise, upon receiving a response, substitute API 124 can perform any necessary filtering, and then respond to the management application instance's request with the filtered/proxied response. As noted above, in some embodiments, filtering proxy application 114 may shunt the request and respond directly with, e.g., cached data.

As example, and referring again to the REST API, a web server can be configured to proxy all requests to filtering proxy application 114 and to the IP address of computing component 102. The capabilities of the web server/filtering proxy application (server side scripting, etc.) can be leveraged to insert/implement the desired filtering of the requests and responses. Other APIs (e.g., SOAP, SNMP, etc.) can be handled/used similarly, although additional configuring may need to be performed due to these APIs being more strictly defined and/or because the protocols are different.

Figure 4:
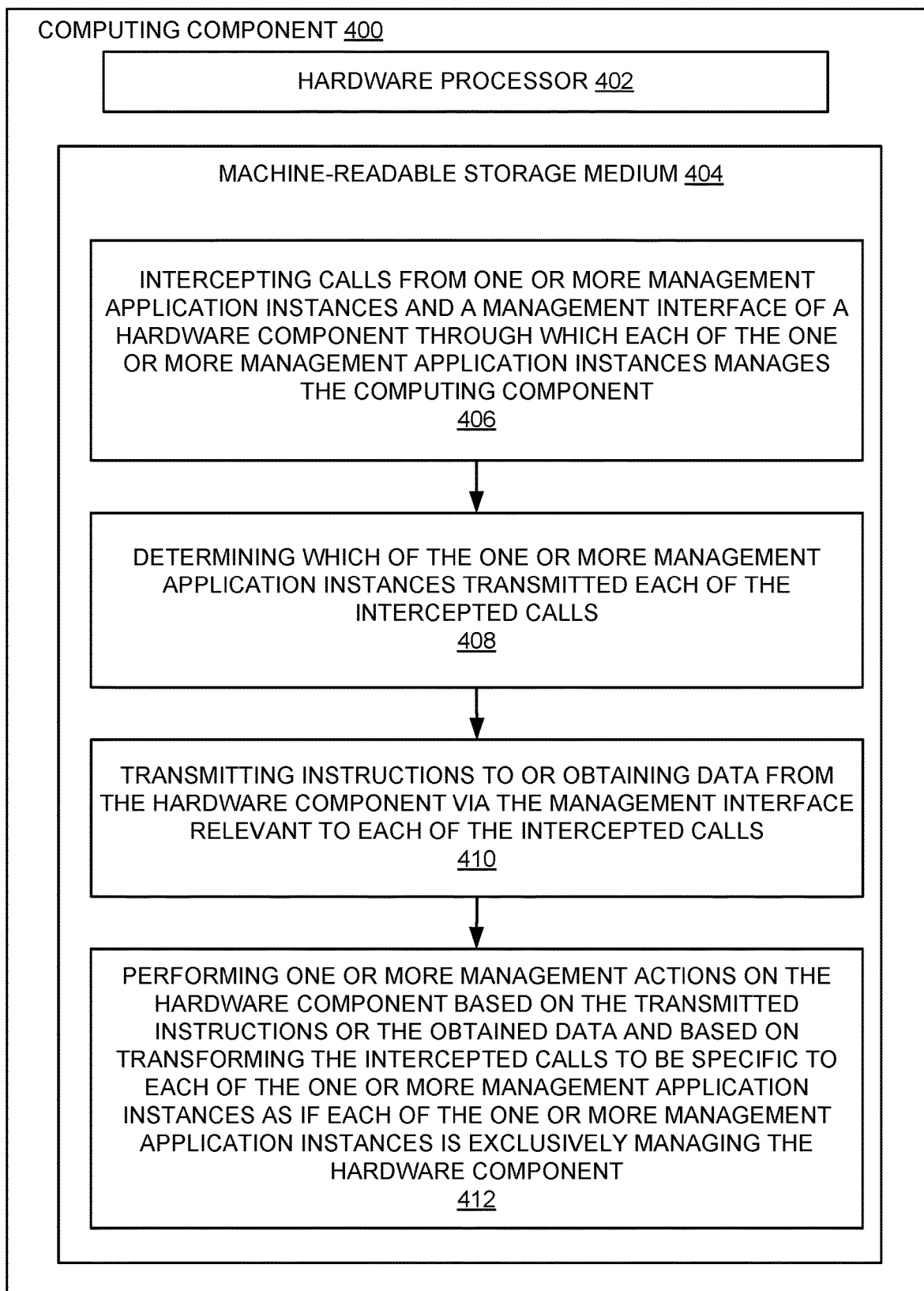
FIG. 4 illustrates an example computing component capable of executing instructions for effectuating parallel hardware sharing in accordance with various embodiments.

FIG. 4 is a block diagram of an example computing component or device 400 for parallel hardware sharing in accordance with one embodiment. Computing component 400 may be, for example, a server computer, a controller, or any other similar computing component, e.g., one in which a filtering proxy application can be implemented (as contemplated above). In the example embodiment of FIG. 4, computing component 400 includes a hardware processor 402, and machine-readable storage medium 404. In some embodiments, computing component 400 may be an embodiment of a controller of any element of FIG. 1 or 2, e.g., a controller for executing filtering proxy application 114, an embodiment of one of clients 132A, 132B . . . 132N, etc.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-412, to control processes or operations for parallel hardware sharing. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-412. Machine-readable storage medium 404 may be an embodiment of machine-readable storage device 108.

Hardware processor 402 may execute instruction 406 to intercept calls from one or more management application instances and a management interface of a hardware component through which each of the one or more management application instances manages the computing component. As noted above, a filtering proxy application such as filtering proxy application 114, may perform certain operations such that each manager appears to be an exclusive manager of a hardware component, e.g., computing component 102. It should be noted that in some cases, computing component 102 (FIG. 2) and computing component 101 (FIG. 4) may be one in the same. As noted above, a filtering proxy application can be implemented on a computing component that one or more managers wish to manage. In other cases, computing component 102 may be a different/separate hardware component from computing component 101, where, as also described above, a filtering proxy application may be implemented on a remote server or computing device.

This is accomplished in part by capturing messages, signals, and the like traversing a system or network, e.g., system 100, between one or more management application instances and a management interface, e.g., management interface 110, of the computing component. For example, the filtering proxy application may capture an API call or outbound request from a particular management application instance so that one or more aspects of the API call or outbound request can be transformed for transmission to the management interface. Thus, it appears to the management application instance as if it is communicating with the management interface and managing it directly, although in actuality it is not.

Hardware processor 402 may execute instruction 408 to determine which of the one or more management application instances transmitted each of the intercepted calls. For example, a filtering proxy application may analyze or parse an API call or outbound request to determine a source of the API call or outbound request. A plurality of management application instances may be managing one or more aspects of a computing component, sometimes simultaneously or sometimes the same aspects. In order to respond properly, as well as perform a management action on the computing component properly, the filtering proxy application may need to determine what information substitutions, what translations, what a current/desired state may be, etc.

It should be understood that knowledge of what transformations, substitutions, etc. need to be performed/need to occur in any given request can be domain-specific or component-specific knowledge or information that is written into a filtering proxy application by a developer. For example, with the OneView-iLO relationship, where iLO is configured with the IP address of the managing OneView instance, a developer of a filtering application proxy can add code to configure the filtering proxy application. The configuration can be coded such that it can support an API that reads the managing OneView instance's IP address, finds the value the filtering proxy application inserted when configuring it, and replaces that value with the IP address of the OneView instance making the read request.

For example, to read the value of the managing OneView instance's IP address, the API may include a call "HTTPS GET 1.2.3.4/data/path/OneViewIP."

If an authorized requestor (there is authorization data required in the header, for example) makes the request, they are returned what is configured. A filtering proxy application can be configured such that when it receives a request to write (for example, using the IP address 172.18.3.4 to proxy to IP address 1.2.3.4) that "HTTP PATCH 172.18.3.4/data/path/OneViewIP {5.6.7.8}."

The filtering proxy application is configured such that it knows that for this request, it must save using the value it was given. If that value is saved in memory for this instance of OneView (knowing from which IP address the request/API call was made), the filtering proxy application is aware that/data/path/OneViewIP is set, and that the value it is set to is 5.6.7.8. The filtering proxy application may then forward the request to the hardware running iLO after substituting the IP address associated with the managing OneView instance used by the filtering proxy application, for example, 172.18.1.1. Thus, the filtering proxy application calls "HTTPS PATCH 1.2.3.4/data/path/OneViewIP {172.18.1.1}." That sets the filtering proxy application IP address 172.18.1.1 as the managing OneView instance for the hardware running iLO. The managing OneView instance may then read back what it just wrote by calling "HTTPS GET 172.18.3.4/data/path/OneViewIP."

Hardware processor 402 may execute instruction 410 to transmit instructions to or obtain data from the computing component via the management interface relevant to each of the intercepted calls. As described above, once the filtering proxy application has filtered/applied one or more filters to a management application instance, a request for the management interface can be communicated thereto, or requested data (such as a state or event) can be sent to the appropriate management application instance.

Hardware processor 402 may execute instruction 412 to perform one or more management actions on the hardware component based on the transmitted instructions or the obtained data and based on transforming the intercepted calls to be specific to each of the one or more management application instances as if each of the one or more management application instances is exclusively managing the hardware component. As noted above, the one or more management actions can include many operations, including configuring the hardware component, controlling access to the hardware component, etc. In some embodiments, when a response is needed, the filtering proxy application may generate responses to one or more of the intercepted calls for the relevant ones of the one or more management application instances based on the transmitted instructions or the obtained data. A response may also be transformed by the filtering proxy application to be specific to each of the one or more management application instances as if each of the one or more management application instances is exclusively managing the hardware component.

Figure 5:
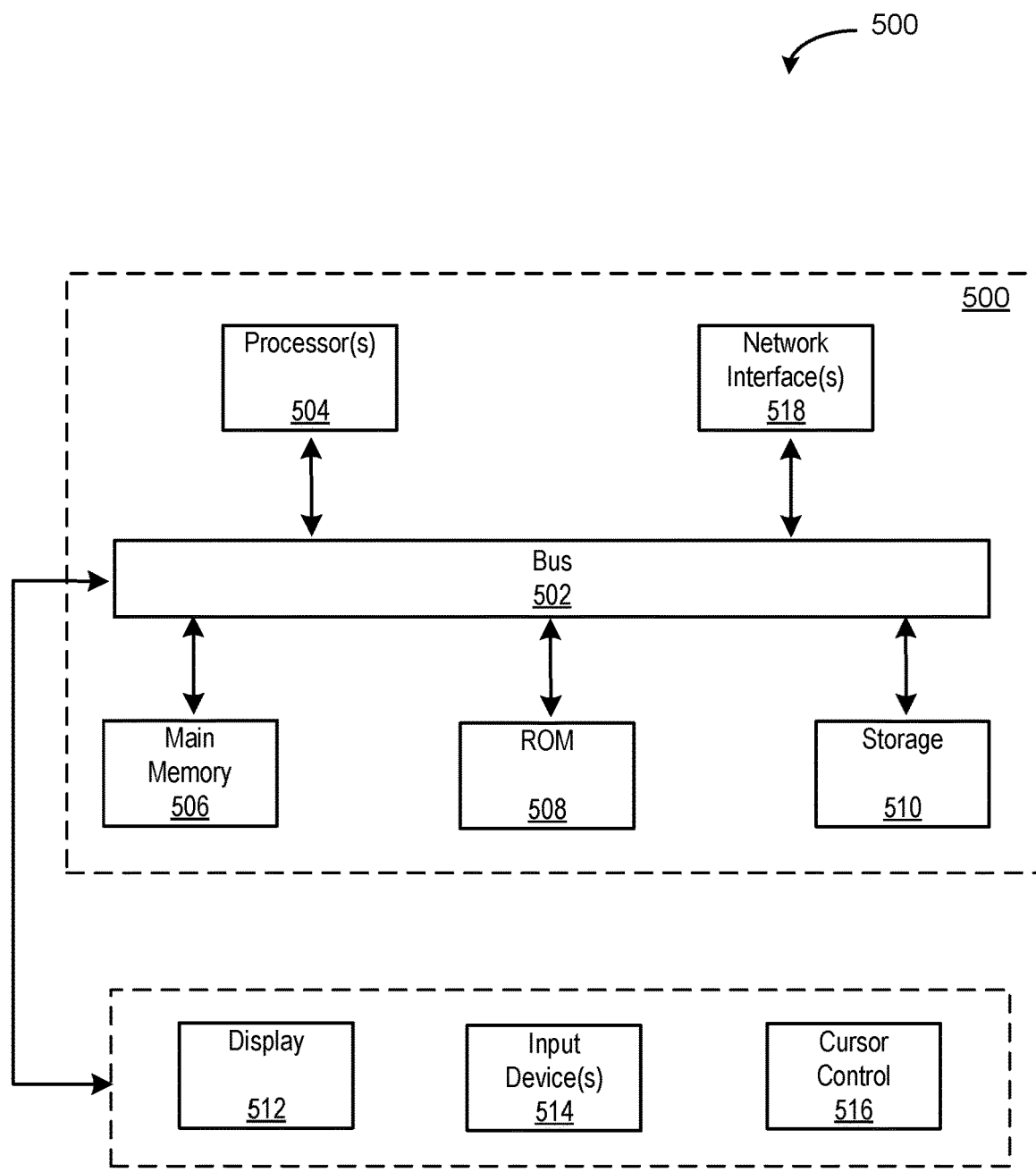
FIG. 5 illustrates an example computing component in which various embodiments described herein may be implemented.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

In general, the word "component," "engine," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method performed by a filtering proxy application for parallel sharing of a hardware component, comprising:
   intercepting, with the filtering proxy application, calls from a plurality of management application instances and a management interface of the hardware component through which each of the plurality of management application instances manages the hardware component, wherein the filtering proxy application provides a single instance of uniquely owned hardware among the plurality of management application instances that each interact with the filtering proxy application as an exclusive manager of the hardware component;
   determining, with the filtering proxy application, which of the plurality of management application instances transmitted each of the intercepted calls;
   at least one of transmitting instructions to and obtaining data from the hardware component via the management interface relevant to each of the intercepted calls; and
   performing, with the filtering proxy application, one or more management actions on the hardware component based on the at least one of the transmitted instructions and the obtained data, and based on transforming the intercepted calls to be specific to each of the plurality of management application instances as if each of the plurality of management application instances is exclusively managing the hardware component to provide parallel sharing of hardware, wherein the one or more management actions comprise:
      in response to a request from one of the plurality of management application instances to configure the hardware component:
         defining a single allowable configuration of the hardware component, and
         caching a state of the hardware component.

2. The method of claim 1, wherein the intercepted calls comprise application programming interface (API) calls.

3. The method of claim 2, further comprising providing an API through which the API calls are generated, wherein the API is the same as that provided by the hardware component.

4. The method of claim 1, wherein the transformation of the intercepted calls comprises substituting at least one of values and attributes necessary for accomplishing the one or more management actions responsive to each of the intercepted calls from values and attributes intended for the filtering proxy application to values and attributes for the hardware component.

5. The method of claim 1, wherein the transformation of each of the intercepted calls comprises substituting at least one of values and attributes necessary for routing each of the intercepted calls to the hardware component instead of the filtering proxy application.

6. The method of claim 1, further comprising generating one or more responses to one or more of the intercepted calls.

7. The method of claim 6, further comprising transforming each of the one or more responses to be specific to each of the plurality of management application instances as if each of the management application instances is exclusively managing the hardware component.

8. The method of claim 7, wherein the transformation of each of the one or more responses substituting at least one of values and attributes necessary for routing each of the one or more response to each of the plurality of management application instances instead of the filtering proxy application.

9. The method of claim 1, wherein the one or more management actions comprises managing a state of the hardware component responsive to one of the intercepted calls, wherein the one of the intercepted calls comprises a request to configure the hardware component.

10. The method of claim 9, further comprising, defining a single allowable configuration of the hardware component and caching an unconfigured state of the hardware component, wherein the unconfigured state is the state of the hardware component with no configuration on the hardware component.

11. The method of claim 10, further comprising filtering and returning actual configuration data to an appropriate one of the plurality of management application instances.

12. The method of claim 10, further comprising returning data representative of the cached unconfigured state to an appropriate one of the plurality of management application instances until receipt of the request to configure the hardware component.

13. The method of claim 1, wherein the one or more management actions comprises handling event information regarding the hardware component to the plurality of management application instances.

14. The method of claim 13, further comprising configuring the filtering proxy application to be an event destination.

15. The method of claim 13, further comprising configuring the filtering proxy application as an event destination for the event information, and providing the event information to the plurality of management application instances.

16. The method of claim 15, further comprising receiving the event information from the hardware component and holding some or all of the event information without passing copies of the event information to the plurality of management application instances.

17. A system, comprising:
a plurality of clients;
a computing hardware component of the system to be managed exclusively by each of the plurality of clients in parallel, the computing hardware component comprising a management processor for managing the computing hardware component, and a management interface through which the management processor is controlled; and
a filtering proxy application operatively connected between each of the plurality of clients and the management interface for filtering information traveling between each of the plurality of clients, wherein the filtering proxy application provides a single instance of uniquely owned hardware among a plurality of management application instances that each interact with the filtering proxy application as an exclusive manager of the computing hardware component and the management interface to provide the appearance of exclusive management to each of the plurality of clients, and wherein the filtering proxy application:
in response to a request from one of the plurality of management application instances to configure the computing hardware component:
defines a single allowable configuration of the computing hardware component, and
caches a state of the computing hardware component.

18. The system of claim 17, wherein the information comprises at least one of requests from each of the plurality of clients, responses to the requests, state information of the computing hardware component, and event information from the computing hardware component.

19. The system of claim 18, wherein the filtering proxy application is configured to filter the requests by substituting at least one of values and attributes of the requests with at least one of other values and attributes of one of the filtering proxy application, an appropriate one of the plurality of management application instances, and the computing hardware component.

20. The system of claim 18, wherein the requests comprise application programming interface calls.

21. A method for managing a hardware component by a management application, comprising:
at a client on which the management application is running, transmitting instructions to and obtaining data from a hardware component via a management interface, the instructions and data relating to management of the hardware component; and
performing one or more management actions on the hardware component based on the at least one of the transmitted instructions and the obtained data, the at least one of the transmitted instructions and the obtained data having been transformed to be specific to each of a plurality of management application instances of the management application as if each of the plurality of management application instances is exclusively managing the hardware component, wherein the one or more management actions comprise:
in response to a request from one of the plurality of management- application instances to configure the hardware component:
defining a single allowable configuration of the hardware component, and
caching a state of the hardware component.

* * * * *